United States Patent

[11] 3,634,857

[72] Inventor George E. Pihl
Abington, Mass.
[21] Appl. No. 22,260
[22] Filed Mar. 24, 1970
[45] Patented Jan. 11, 1972
[73] Assignee Miniature Electronic Components Corporation
Holbrook, Mass.

[54] DRUM INDICATOR
15 Claims, 3 Drawing Figs.

[52] U.S. Cl. .................................................. 340/373
[51] Int. Cl. .................................................. G08b 5/22
[50] Field of Search .................................... 340/373, 376, 377, 378 R, 378 A

[56] References Cited
UNITED STATES PATENTS
3,451,055  6/1969  Pihl ............................. 340/373
3,487,403  12/1969 Pihl ............................. 340/373
3,430,170  2/1969  Shatas et al. ................ 340/373 X
2,415,452  2/1947  Taylor et al. ................. 340/373
3,364,481  1/1968  Fuzzell ........................ 340/373

OTHER REFERENCES
McCrady, Sec. 134, pp. 182– 183, Fourth Ed. 1959

Primary Examiner—Robert L. Richardson
Attorney—Schiller & Pandiscio

ABSTRACT: A two-position indicating device including a rotatable indicator member that carries a single permanent magnet and is mounted so that it can rotate between two limit positions determined by a single pole piece of a stationary electromagnetic structure. The electromagnetic structure may comprise either one or two coils wound around the pole piece for establishing electromagnetic fields to effect movement of the indicator member between the two limit positions. The rotatable member is adapted to provide different indications in the two limit positions. A modification of the invention includes a permanent magnet associated with the electromagnetic structure to restore the rotatable member to a given limit position.

PATENTED JAN 11 1972

3,634,857

GEORGE E. PIHL
INVENTOR.

BY Schiller & Pandiscio
ATTORNEYS.

DRUM INDICATOR

This invention relates to miniature electromagnetic indicators and more particularly to indicators capable of indicating two different predetermined conditions.

An object of this invention is to provide an improvement over the miniature electromagnetic indicator capable of reliable binary indication as set forth in my U.S. Pat. No. 3,451,055.

Another object is to provide a new quick-acting binary electromagnetic indicator that is self-latching in both of its two display positions.

Another improvement is to provide a self-latching electromagnetic indicator that does not display a false indication under the influence of shock or vibration.

Still another object is to provide a miniature electromagnetic indicator that is adapted for pulse operation, requires relatively low input power, is designed for rapid assembly, and has a compact construction.

A further specific object of the present invention is to provide an electromagnetic indicator comprising a rotatable indicator member carrying a single permanent magnet and an electromagnetic assembly for operating the indicator member comprising a single pole piece and either a single coil or two concentrically wound coils for developing magnetic fields to rotate said member between two limit positions.

Another object is to provide an electromagnetic indicator having means for automatically restoring the indicator member to a predetermined one of the two limit positions when the energizing input is terminated.

Yet another object of the present invention is to provide an electromagnetic indicator which is smaller, more compact and less expensive to manufacture than prior art indicators of the type set forth in my U.S. Pat. No. 3,451,055.

In a preferred embodiment of the invention the foregoing and other objects are achieved by a construction comprising a rotatable drum-type indicator member provided with a single permanent magnet and electromagnetic means operative to rotate the indicator member, the electromagnetic means comprising a single pole piece that mechanically determines two limits of movement of the indicator member and coacts with the aforesaid permanent magnet to magnetically latch the indicator at each limit position, and at least one coil adapted for energization so as to rotate said indicator member to its two limit positions selectively. In one embodiment of the invention two concentrically wound coils are provided surrounding the pole piece. Each coil is connected to its own pair of terminal leads so that separate inputs are required to rotate the indicator member in one direction or the other between its two limit positions. Each coil is wound and energized so that the magnetic field of one coil is polarized in a direction opposite to the magnetic field of the other coil, and the input pulses are always applied with a polarity such as to provide a force of magnetic repulsion on the nearest pole of the magnet carried by the indicator member. Preferably both coils are wound in the same direction and the polarity of the energizing signal applied to one coil is opposite to that of the signal applied to the other coil. Alternatively the coils may be wound in opposite directions and energized with signals of the same polarity. In an alternative embodiment only one coil is associated with the pole piece and movement of the indicator member first in one direction and then in the opposite direction is achieved by pulsing the coil with pulses of opposite polarity. The indicator may also be provided with another permanent magnet arranged with respect to the pole piece so as to automatically restore the indicator member to a predetermined one of its two limit positions after the energizing signal that caused it to move to the other limit position has terminated.

Other objects and many of the attendant advantages of the present invention will become more readily apparent from the following detailed specification when considered together with the accompanying drawings wherein.

Figure 1:
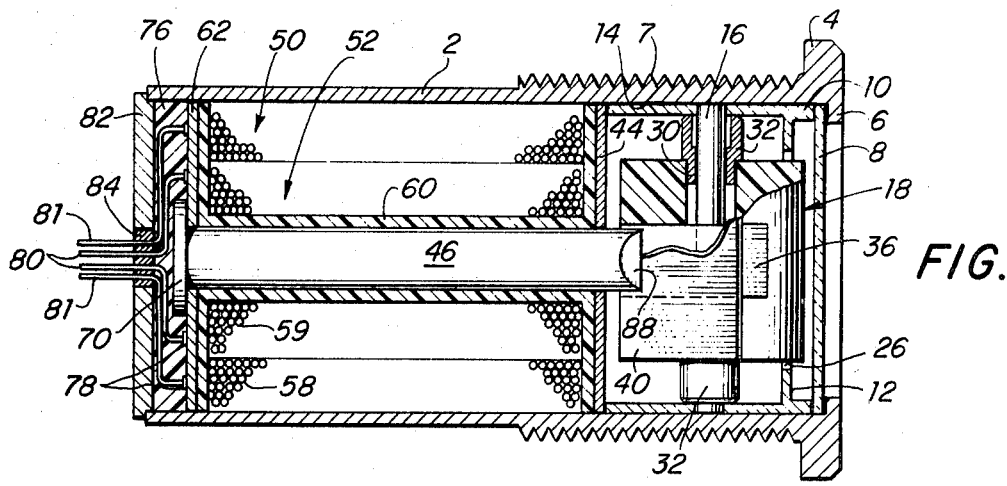
FIG. 1 is a longitudinal, partial sectional view of one embodiment of the invention taken along line 1—1 in FIG. 2.
Figure 2:
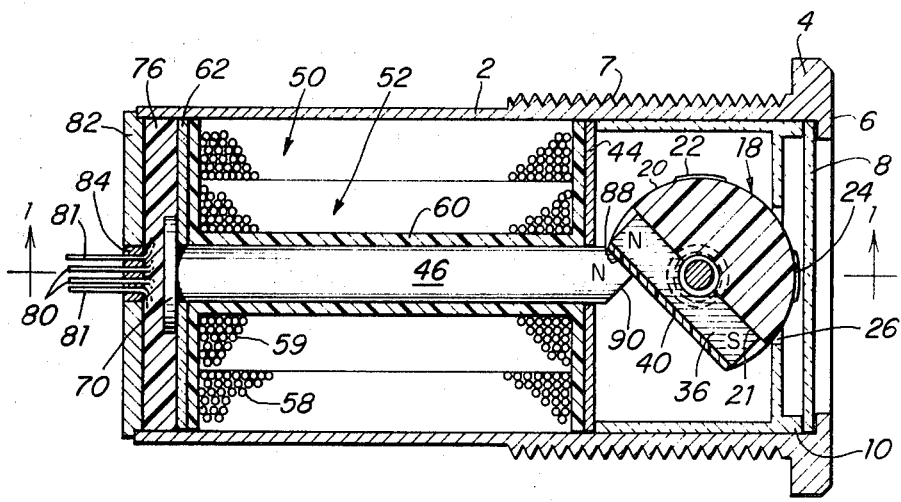
FIG. 2 is a longitudinal partial sectional view of the same embodiment taken at a right angle to the view of FIG. 1 with certain portions shown in full.

Turning now to FIGS. 1 and 2, the construction and manner of assembling one embodiment will now be described. The indicator device comprises a cylindrical case 2 that preferably is made of a suitable metal such as aluminum but also may be made of a strong plastic material. The case is formed with open ends, one of which has an external flange 4 and an internal lip 6. Flange 4 is provided for mounting the indicator to an instrument panel, by means, for example, as a nut screwed onto the threaded portion 7 of case 2 adjacent flange 4. The internal lip 6 functions as a shoulder for a disc 8 that may be made of clear glass or a transparent plastic and functions as a window. The window disc 8 is held against lip 6 by a spacer ring 10 which is formed as an integral part of end wall 12 of an inverted cylindrical cup 14. The latter has in its sidewall two diametrically opposed holes that accommodate the opposite ends of a stainless steel shaft 16. Positioned on this shaft is an indicator member in the form of a plastic drum 18. This indicator member has a circularly curved surface 20 terminating in a flat surface 21. The surface 20 has two discrete areas illustrated for convenience by the raised portions 22 and 24 (FIG. 2) that carry appropriate legends. The legends may be in various forms and may constitute words or symbols or other indicia. Thus, for example, the legends may consist merely of differently colored segments, typically one green and the other red. In another example, the legend on raised portion 22 may consist of a word such as "GO" or "ON," while the other legend on raised portion 24 may consist of a word or phrase of opposite meaning such as "NO GO" or "OFF." The end wall 12 of cup 14 is provided with an aperture 26 sized so as to display only one legend at a time at each of two predetermined limit positions of the indicator member. The latter is rotatably supported on shaft 16 by two combination, integrally formed, plastic bearing sleeves 30 and spacers 32, made preferably of brass, that engage the inner surface of the sidewall of cup 14. These combination sleeves 30 and spacers 32 allow the drum 18 to rotate about shaft 16 while preventing any substantially axial or radial movement between the drum and the shaft.

The flat surface 21 of indicator member 18 is notched to accommodate a single elongate bar magnet 36 of rectangular cross section that is cemented in place. The magnet 36 is mounted so that the longest dimension of the magnet extends transversely of shaft 16 and is notched as shown in FIG. 2 to avoid contact with the shaft. The side surface of the magnet located furthest from the curved surface of the drum is covered fully by a sheet of plastic material 40. The latter preferably is made of Teflon and is cemented to the magnet and the indicator drum. The purpose of plastic sheet 40 is explained hereinafter.

Movement of the indicator member 18 is effected by energization of electromagnetic means now to be described. The electromagnetic means comprises a brass disc 44 that engages and bears against the open end of cup 14, a single round soft iron pole piece 46, two concentrically wound solenoids 50 and 52 comprising coils of wire 58 and 59 respectively wound concentrically on a hollow plastic insulating bobbin 60, and a printed circuit board 62. Pole piece 46 extends through bobbin 60, with one end of the bobbin 60 engaging and pressing against brass disc 44 and the other end engaging and pressing against one face of circuit board 62.

Circuit board 62 has a hole through which extends pole piece 46 and the latter is provided with an end flange 70 that engages the other face of circuit board 62 and presses it against the end of bobbin 60. The circuit board 62 is secured in place by a suitable insulating potting compound 76 such as epoxy resin. The outer surface of printed circuit board 62 is provided with four conductive lands 78. The ends of the coils 58 and 59 are brought out through the end of the bobbin and circuit board 62 and soldered to the four lands. Also attached to lands 78 are two pairs of terminal leads 80 and 81. Leads 80 form terminals for the ends of coil 59 and leads 81 form terminals for the ends of coil 58. An end plate 82 made of the same material as case 2 is cemented to the latter over the potting compound 76. End plate 82 has a central aperture through which are brought out the two pairs of terminal leads 80 and 81. This central aperture is sealed with a suitable insulating material 84.

The brass disc 44 is provided with a hole through which extends pole piece 46. The latter protrudes beyond disc 44 far enough to intercept indicator member 18 when it is in either one of its two limit positions and the protruding end is beveled so as to provide a wedge-shaped point defined by two converging flat surfaces 88 and 90 that meet along a line extending parallel to shaft 16. Surface 88 of the pole piece determines a first limit position of indicator member 18 while surface 90 determines a second limit position. FIG. 2 illustrates the first limit position. Movement of indicator member 18 clockwise from the position in FIG. 2 will bring it to its second limit position.

As indicated above, the two coils are arranged so that the magnetic fields produced by coupling them to the same power source (not shown) will be of opposite polarity. In practice the indicator is coupled to the energizing power source through suitable switching means (not shown) that determines which of the two coils is energized. The switching means may be manually or automatically operated and may, for example, be a relay or an electronic switching circuit arranged to respond to a sensor or transducer. The signal required to operate the indicator consists of a pulse of relatively short duration. Hence, the power source may be of a type adapted to provide a steady DC output and the switch is of the momentary acting type so as to pass a short pulse of current when it is actuated. Other circuit arrangements for selectively energizing the coils are believed obvious to persons skilled in the art.

The device as above described and illustrated in FIGS. 1 and 2 operates as follows. Assume that indicator member 18 is located in its first limit position (FIG. 2) so that the north pole of magnet 36 is proximate to surface 88 of pole piece 46. Assume now that the switching means (not shown) is actuated so as to pass a short current pulse through solenoid 50 to produce a polarized magnetic field such that the wedge-shaped end of pole piece 46 acts as a north magnetic pole (as demonstrated by the letter N shown in full lines in FIG. 2). Since the pole piece is disposed so as to be aligned with the ends of magnet 36, pole piece 46 will direct a repelling magnetic force at the adjacent north pole of magnet 36, whereupon the indicator member will be impelled to rotate clockwise from the limit position of FIG. 2 to its second position wherein the south pole of magnet 36 is proximate to surface 90 of the pole piece. The repelling force is sufficiently strong to cause the indicator member to move almost instantaneously with energization of solenoid 50. As the indicator member rotates clockwise away from the position of FIG. 2, the magnetic field at the south pole of magnet 36 exerts a stronger influence on the pole piece 46 until at some undetermined point the movement of the indicator member is due as much to the attraction of the pole piece 46 to the south pole of magnet 36 as it is to its inertia. After solenoid 50 has been deenergized, the indicator member will be held in the second limit position by virtue of the continued attraction of the pole piece 46 for the south pole of magnet 36. Restoration of the indicator to its first limit position is accomplished by energizing solenoid 52 so that the wedge-shaped end of pole piece 46 acts as a south magnetic pole. Since the south pole of magnet 36 is now located proximate to surface 90 of pole piece 46, the magnet will be repelled, causing the indicator member to rotate counterclockwise back to its original position illustrated in FIG. 2. The indicator member will be held in this new position even after solenoid 52 has been deenergized due to the attraction of the pole piece 46 to the north pole of magnet 36.

As indicated earlier the time duration of the current pulses applied to the solenoids to effect a change of position of the indicator member is relatively short and may even be as short as half the transit time of the indicator member. The important thing is that the pulses must have an amplitude sufficient to reverse the polarity of the magnetism in the pole piece which has been induced by the presence of the nearest pole of permanent magnet 36.

Figure 3:
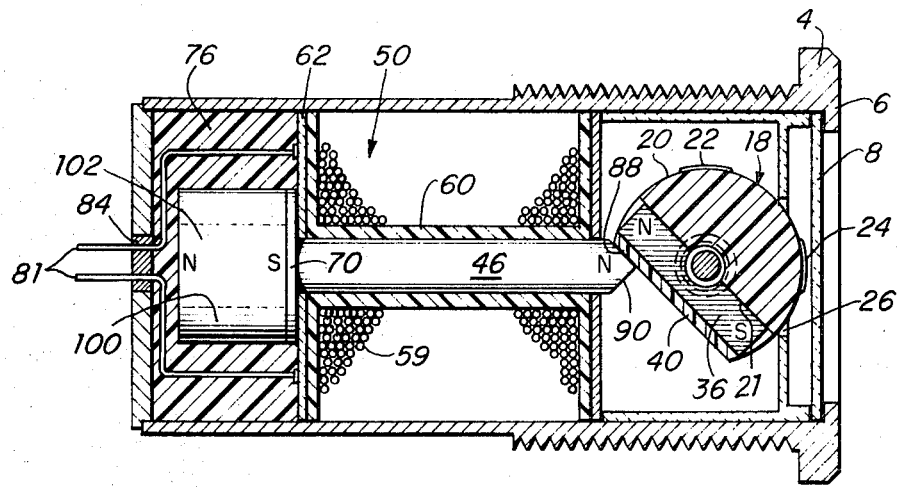
FIG. 3 is a longitudinal sectional view similar to FIG. 2 of another embodiment of the invention.

An alternative embodiment of the invention is shown in FIG. 3. The same numerals are used for the parts in FIG. 3 as are used for the corresponding parts in FIGS. 1 and 2. Instead of using two concentrically wound coils as in FIGS. 1 and 2, the embodiment of FIG. 3 uses a single solenoid 50 and a magnet 100 of annular shape whose south pole labeled S is affixed to and in direct contact with end flange 70 of pole piece 46. The hole in magnet 100 is indicated at 102.

This embodiment differs slightly from that of FIGS. 1 and 2 in that when solenoid 50 is energized, a magnetic field is produced such that the wedge-shaped end of pole piece 46 acts as a north magnetic pole (as demonstrated by the letter N shown in full lines at the wedge-shaped end). Pole piece 46 then directs a repelling magnetic force at the adjacent north pole of magnet 36. The indicator then rotates to its second position in the same manner as described with respect to FIGS. 1 and 2. When solenoid 50 is deenergized, however, since pole piece 46 is in contact with the south pole of magnet 100, a repulsion force is established between the wedge-shaped end of the pole piece 46, which now has a magnetic force acting as a south pole, and the south pole of magnet 36. This repulsion force restores indicator member 18 to its first limit position wherein the north pole of magnet 36 is proximate to the wedge-shaped end of pole piece 46.

The indicator of FIG. 3 could alternatively be arranged so that the field produced by energizing solenoid 50 would be of opposite polarity and the permanent magnet 100 would have its north pole in contact with end flange 70. With this alternative arrangement, energization of solenoid 50 would create a south pole at the wedge-shaped end of pole piece 46, thereby repelling the south pole of magnet 36. On deenergization of solenoid 50 the north pole of magnet 36, then proximate to the wedge-shaped end of pole piece 46, would be repelled from pole piece 46 and automatically restored to its other position because of the polarity of pole piece 46 induced by magnet 100.

It is significant to note that the Teflon sheet 40 acts to provide a small nonmagnetic gap between the magnet 36 and pole piece 46 in the two limit positions of the indicator member. This gap is essential to proper operation of the indicator. While sheet 40 may be made of some other material having the desired electrical characteristics, use of a polyfluorocarbon resin such as Teflon is preferred because such plastics have little or no tendency to adhere to most other materials. Providing a nonstick surface for the indicator member where it engages the pole piece is important considering the relatively weak magnetic forces to which the indicator member is subjected. The overall design of the device makes possible rapid operation with relatively little power input, yet assures firm latching of the indicator member in the absence of an input signal. It also is important to note that the invention as represented by the embodiments herein described and illustrated is adapted for rapid assembly with the various components and subassemblies being insertable in order starting with the transparent window disc 8.

Indicators embodying this invention have application in a variety of electronic systems, including systems installed in airborne vehicles such as jet aircraft and rockets. They are particularly useful in places where illuminated indicators provide insufficient contrast with ambient light or have a tendency to premature failure due to shock and vibration.

What is claimed is:

1. In an indicator of the character described the combination of electromagnetic means including a single pole piece and two concentrically wound coils surrounding at least a portion of said pole piece, an indicator member with a single elongate permanent magnet attached thereto, means supporting said indicator member for rotational movement about an axis extending transversely of the longitudinal axes of said pole piece and said magnet between two alternate limit positions determined by said pole piece in each of which the attraction of said pole piece to one end of said magnet tends to restrain said indicator member against movement toward the other limit position, said indicator member adapted to indicate different conditions in said two alternate limit positions, said two coils being adapted for selective energization so that one coil produces a magnetic field oriented to repel said indicator member away from one of said limit positions and impel it to the other of said limit positions and the other coil produces a magnetic field oriented to repel said indicator member away from said other limit position and impel it back to said one limit position.

2. In an indicator of the character described the combination of electromagnetic means including a single pole piece and a single coil surrounding at least a portion of said pole piece, an indicator member with a single permanent magnet attached thereto, means supporting said indicator member for rotational movement about an axis extending transversely of the longitudinal axes of said pole piece and said magnet between two alternate limit positions determined by said pole piece in each of which the attraction of said pole piece to one end of said single magnet tends to restrain said indicator member against movement toward the other limit position, said indicator member adapted to indicate different conditions in said two alternate limit positions, said coil being adapted for energization so that when energized with a current of one polarity the resulting magnetic field will repel said indicator member away from one of said limit positions and impel it to the other of said limit positions and when energized with a current of opposite polarity the resulting magnetic field will repel said indicator member away from said other limit position and impel it back to said one limit position.

3. An indicator as set forth in claim 2 including another permanent magnet disposed to magnetically polarize said pole piece so as to influence said indicator member to assume a predetermined one of said limit positions when said coil is deenergized.

4. An electromagnetic indicator comprising a single elongate pole piece made of magnetic material, an indicator member that includes a permanent magnet, means mounting said indicator member for rotation on a fixed axis that extends substantially perpendicular to the longitudinal axis of said pole piece, said fixed axis being disposed so that said indicator member can rotate between first and second limit positions each determined by engagement of a portion of said indicator member with an end section of said pole piece, said permanent magnet extending transversely of said fixed axis and having discrete north and south magnetic poles that are disposed on opposite sides of said fixed axis so that said north pole is closest to and said south pole furthest from said pole piece end section when said indicator member is in said first limit position and said south pole is closest to and said north pole furthest from said pole piece end section when said indicator member is in said second limit position, and electromagnet means for magnetizing said pole piece to impart either of two opposite magnetic polarities to said pole piece end section so as to cause rotation of said indicator member from one to the other of said two limit positions by magnetic repulsion of said magnet.

5. An indicator as defined by claim 4 wherein said indicator member is provided with at least one predetermined legend, and further wherein said indicator includes means for concealing said legend when said member is in one of said positions and revealing said legend in the other of said positions.

6. An indicator as defined by claim 4 wherein said indicator member includes means for preventing direct contact between said magnet and said pole piece.

7. An indicator according to claim 4 wherein said last-mentioned means overlies said magnet in position to contact said pole piece in each of said two positions.

8. An indicator as defined by claim 4 further including nonconductive means on said magnet for maintaining a working gap between said pole piece and said magnet in both of said predetermined limit positions.

9. An indicator as defined by claim 4 wherein said electromagnet means comprises a single coil surrounding said pole piece.

10. An indicator as defined by claim 4 wherein said electromagnet means comprises two coils surrounding said pole piece.

11. An indicator as defined by claim 4 wherein said magnet is disposed in a plane extending through said shaft, and further wherein said magnet is notched so as to provide a gap between it and said shaft.

12. An indicator according to claim 4 wherein said magnet and said pole piece are located in a common plane that extends at substantially a right angle to said fixed axis and further wherein the said portion of said indicator member is a flat surface made of a nonmagnetic material that provides a nonmagnetic gap between said magnet and said pole piece.

13. In an indicator of the character described the combination of electromagnetic means including a single pole piece and a single coil surrounding at least a portion of said pole piece, an indicator member with a single permanent magnet attached thereto, means supporting said indicator member for rotational movement about an axis extending transversely of the longitudinal axes of said pole piece and said magnet between two alternate limit positions determined by said pole piece in each of which the attraction of said pole piece to one end of said single magnet tends to restrain said indicator member against movement toward the other limit position, said indicator member adapted to indicate different conditions in said two alternate limit positions, a second fixed permanent magnet for magnetically polarizing said pole piece so that said pole piece will magnetically influence said indicator magnet to cause said indicator to assume one of said two limit positions, and said coil being adapted for energization so that when energized with a current of predetermined polarity the resulting magnetic field through said pole piece will influence said indicator magnet to rotate said indicator member to the other of said two limit positions.

14. An electromagnetic indicator comprising an indicator member mounted for rotation on a fixed axis, said indicator member having a pair of permanently magnetized poles with a magnetic axis that extends transversely of said fixed axis with said fixed axis located between said poles, and an electromagnet assembly comprising (1) a single pole piece extending at a right angle to said fixed axis with a section of said pole piece being disposed to intercept first and second portions of said indicator member so as to establish first and second limit positions respectively for said indicator member and prevent alignment of said magnetized poles with said pole piece, and (2) means including a coil for magnetizing said pole piece to impart either of two opposite magnetic polarities to said pole piece section whereby to magnetically influence said indicator to rotate from one to the other of said limit positions.

15. An indicator according to claim 14 wherein said means for magnetizing said pole piece also comprises a permanent magnet with magnetic poles oriented so as to magnetically influence said indicator member to assume and remain in said first limit position when said coil is deenergized.

* * * * *